US011796003B2

(12) United States Patent
Dittmar

(10) Patent No.: US 11,796,003 B2
(45) Date of Patent: Oct. 24, 2023

(54) FLINGER FOR A SEAL ASSEMBLY OF A WHEEL BEARING ASSEMBLY

(71) Applicant: AKTIEBOLAGET SKF, Gothenburg (SE)

(72) Inventor: Rico Dittmar, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 48 days.

(21) Appl. No.: 17/535,655

(22) Filed: Nov. 25, 2021

(65) Prior Publication Data

US 2023/0160432 A1 May 25, 2023

(51) Int. Cl.
*F16C 33/78* (2006.01)
*B60B 27/00* (2006.01)
*F16C 33/80* (2006.01)
*F16C 19/38* (2006.01)

(52) U.S. Cl.
CPC ...... *F16C 33/7816* (2013.01); *B60B 27/0073* (2013.01); *F16C 33/7886* (2013.01); *F16C 33/805* (2013.01); *F16C 19/386* (2013.01); *F16C 2326/02* (2013.01)

(58) Field of Classification Search
CPC .. F16C 33/7816; F16C 33/7886; F16C 33/80; F16C 33/805; F16C 2326/02; F16C 19/386; B60B 27/0073
See application file for complete search history.

(56) References Cited

U.S. PATENT DOCUMENTS

| 3,814,446 | A  | 6/1974 | Derman |
| 7,021,830 | B2 | 4/2006 | Takehara et al. |
| 7,674,044 | B2 | 3/2010 | Matsui |
| 8,267,591 | B2 | 9/2012 | Baba et al. |

(Continued)

FOREIGN PATENT DOCUMENTS

| JP | 2006161860 A | * | 6/2006 | .......... F16C 33/7879 |
| JP | 2009197884 A |   | 9/2009 | |

(Continued)

OTHER PUBLICATIONS

Machine Translation of JP-2017015125-A (Year: 2017).*

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A seal assembly is for a wheel bearing assembly including an inner axle and a rotatable outer hub disposed about the axle. The seal assembly includes an annular inner case having an axial portion disposable about the axle and a radial portion extending radially outwardly from the axial portion. A seal is coupled with the hub and has sealing lip(s) sealingly engageable with the annular case. Further, an annular flinger has an inner radial end coupled with or integrally formed with the annular inner case and an outer radial end including an outer axial portion spaced radially inwardly from the inner circumferential surface of the hub so as to define an annular labyrinth gap. The flinger includes a central portion that is at least partially frustoconical and extends between the inner and outer axial ends so as to obstruct an annular space between the inner case and the seal.

16 Claims, 14 Drawing Sheets

(56) References Cited

U.S. PATENT DOCUMENTS

| | | |
|---|---|---|
| 8,356,942 B2 | 1/2013 | Torii et al. |
| 8,734,022 B2 * | 5/2014 | Dittmar ............... F16J 15/3276 |
| | | 384/480 |
| 8,905,645 B2 | 12/2014 | Komori et al. |
| 8,979,385 B2 | 3/2015 | Haepp et al. |
| 9,139,041 B2 | 9/2015 | Duch et al. |
| 9,261,144 B2 | 2/2016 | Duch |
| 9,403,405 B2 | 8/2016 | Barberis et al. |
| 9,534,636 B2 | 1/2017 | Takayama et al. |
| 9,956,820 B2 | 5/2018 | Gulli et al. |
| 10,119,571 B2 | 11/2018 | Seno et al. |
| 10,233,973 B2 | 3/2019 | Wollert et al. |
| 10,240,674 B2 | 3/2019 | Sakai et al. |
| 10,605,369 B2 | 3/2020 | Kato |
| 10,677,291 B2 | 6/2020 | Senda |
| 10,900,524 B2 | 1/2021 | Seki et al. |
| 11,067,130 B2 | 7/2021 | Kim et al. |
| 11,085,493 B2 | 8/2021 | Yu |
| 11,420,467 B2 | 8/2022 | Barberis et al. |
| 2002/0130655 A1 | 9/2002 | Okada et al. |
| 2005/0089254 A1 | 4/2005 | Takehara et al. |
| 2007/0024273 A1 * | 2/2007 | Kobayashi ......... F16C 33/7879 |
| | | 310/168 |
| 2007/0081751 A1 | 4/2007 | Norimatsu et al. |
| 2008/0292231 A1 | 11/2008 | Matsui |
| 2009/0127796 A1 | 5/2009 | Kanzaki et al. |
| 2009/0206553 A1 | 8/2009 | Kanzaki |
| 2009/0322032 A1 | 12/2009 | Kanzaki |
| 2010/0232734 A1 | 9/2010 | Torii et al. |
| 2010/0247014 A1 | 9/2010 | Ohmori et al. |
| 2011/0044569 A1 * | 2/2011 | Haepp ................. F16C 33/768 |
| | | 384/480 |
| 2011/0262063 A1 * | 10/2011 | Dittmar ............... F16J 15/3276 |
| | | 384/147 |
| 2011/0262069 A1 | 10/2011 | Baba et al. |
| 2013/0127119 A1 | 5/2013 | Haepp et al. |
| 2014/0003753 A1 | 1/2014 | Haepp et al. |
| 2014/0376848 A1 | 12/2014 | Duch et al. |
| 2015/0063734 A1 | 3/2015 | Duch |
| 2015/0117805 A1 | 4/2015 | Takayama et al. |
| 2016/0003302 A1 | 1/2016 | Seno et al. |
| 2016/0031261 A1 * | 2/2016 | Ciulla ................. B60B 27/0073 |
| | | 384/484 |
| 2016/0091023 A1 | 3/2016 | Shiono et al. |
| 2016/0221391 A1 | 8/2016 | Lim et al. |
| 2016/0236509 A1 | 8/2016 | Gullì et al. |
| 2018/0135700 A1 | 5/2018 | Senda |
| 2018/0156336 A1 * | 6/2018 | Kato ..................... F16C 33/805 |
| 2020/0079150 A1 | 3/2020 | Barberis et al. |
| 2020/0141448 A1 | 5/2020 | Kim et al. |
| 2020/0292000 A1 | 9/2020 | Yu |
| 2021/0041025 A1 * | 2/2021 | Duch .................... F16C 19/182 |
| 2021/0129582 A1 | 5/2021 | Regan et al. |
| 2021/0254668 A1 | 8/2021 | Suzuki |
| 2021/0355995 A1 | 11/2021 | Sugawara et al. |
| 2021/0387474 A1 | 12/2021 | Bertola et al. |
| 2022/0213931 A1 | 7/2022 | Seki |
| 2023/0015151 A1 | 1/2023 | Dittmar |

FOREIGN PATENT DOCUMENTS

| | | | | |
|---|---|---|---|---|
| JP | 2010091036 A | * | 4/2010 | ......... F16C 33/7879 |
| JP | 2013217419 A | * | 10/2013 | ......... F16C 33/7879 |
| JP | 2017013706 A | * | 1/2017 | ......... F16C 33/7883 |
| JP | 2017015125 A | * | 1/2017 | |

OTHER PUBLICATIONS

Machine Translation of JP-2013217419-A (Year: 2013).*
Unpublished U.S. Appl. No. 17/373,941.
Unpublished U.S. Appl. No. 17/373,954.
Unpublished U.S. Appl. No. 17/373,941, filed Jul. 13, 2021.
Unpublished U.S. Appl. No. 17/373,954, filed Jul. 17, 2021.

* cited by examiner

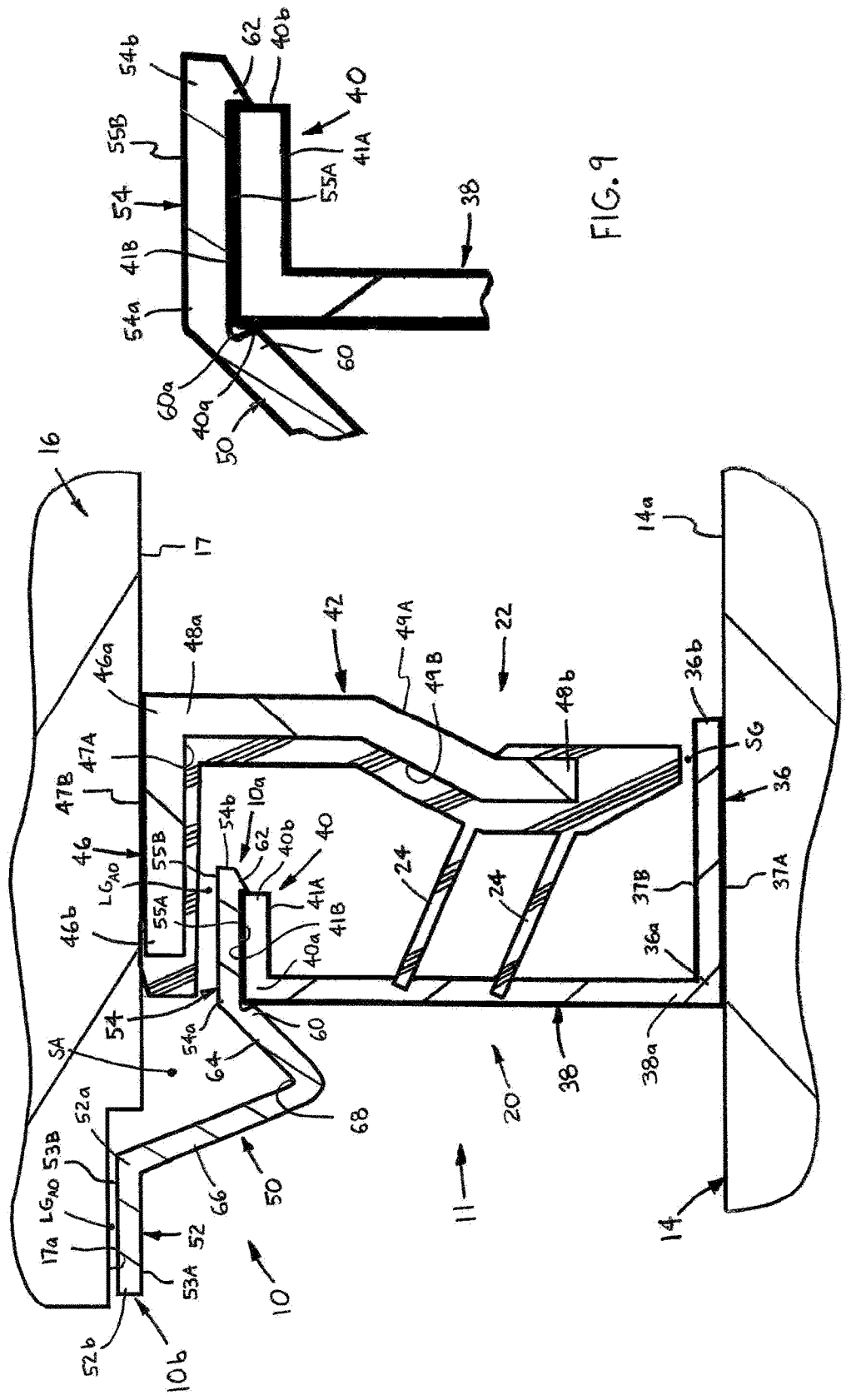

FLINGER FOR A SEAL ASSEMBLY OF A WHEEL BEARING ASSEMBLY

BACKGROUND OF THE INVENTION

The present invention relates to seals, and more particularly to seals for wheel bearing assemblies.

Wheel bearing assemblies, particularly for mounting wheels to vehicles such as trucks, typically include an inner axle connected with a vehicle frame, an outer hub connectable to the wheel, and a bearing for rotatably coupling the hub with the axle. The bearings are often double-row tapered rollers disposed between the outer hub and the inner axle and enable the hub, and thereby the wheel, to rotate about a central axis extending through the fixed axle. As such bearings are generally exposed to contaminants such as brake dust, dirt, oil, metal shavings, etc., which may damage the bearings if contacting the rolling elements or the bearing raceway surfaces, one or more seals are provided adjacent to the raceways to exclude such contaminants. Such seal assemblies primarily function to retain lubricant, for example, oil, grease, etc., within the bearing. Further, when such wheel hub assemblies are used on an electric vehicle, it is particularly important to minimize friction within the hub assembly to reduce electric power consumption and prevent premature drainage of the vehicle batteries.

SUMMARY OF THE INVENTION

In one aspect, the present invention is a seal assembly for a wheel bearing assembly, the wheel bearing assembly including an inner axle with a central axis and an outer hub disposed about the inner axle and having an inner circumferential surface defining a bore. The axle extends through the bore and a plurality of rolling elements rotatably couples the hub with the axle such that the hub rotates about the axis. The seal assembly comprises an annular inner case having an axial portion disposable about the axle and a radial portion extending radially outwardly from the axial portion. A seal is coupled with the hub and has at least one sealing lip sealingly engageable with the inner case. Further, an annular flinger has an inner radial end coupled with or integrally formed with the annular inner case and an outer radial end including an outer axial portion spaced radially inwardly from the inner circumferential surface of the hub so as to define an annular labyrinth gap.

In another aspect, the present invention is a wheel bearing assembly comprising an inner axle with a central axis, an outer hub disposed about the axle and having a bore, the axle extending through the bore, a plurality of rolling elements rotatably coupling the hub with the axle such that the hub rotates about the axis, and a seal assembly as described in the preceding paragraph.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 8 is a broken-away, enlarged axial cross-sectional view of an upper portion of the wheel bearing assembly, showing one seal assembly with a fourth construction flinger;

FIG. 9 is a more enlarged view of a portion of FIG. 8

DETAILED DESCRIPTION OF THE INVENTION

Figure 1:
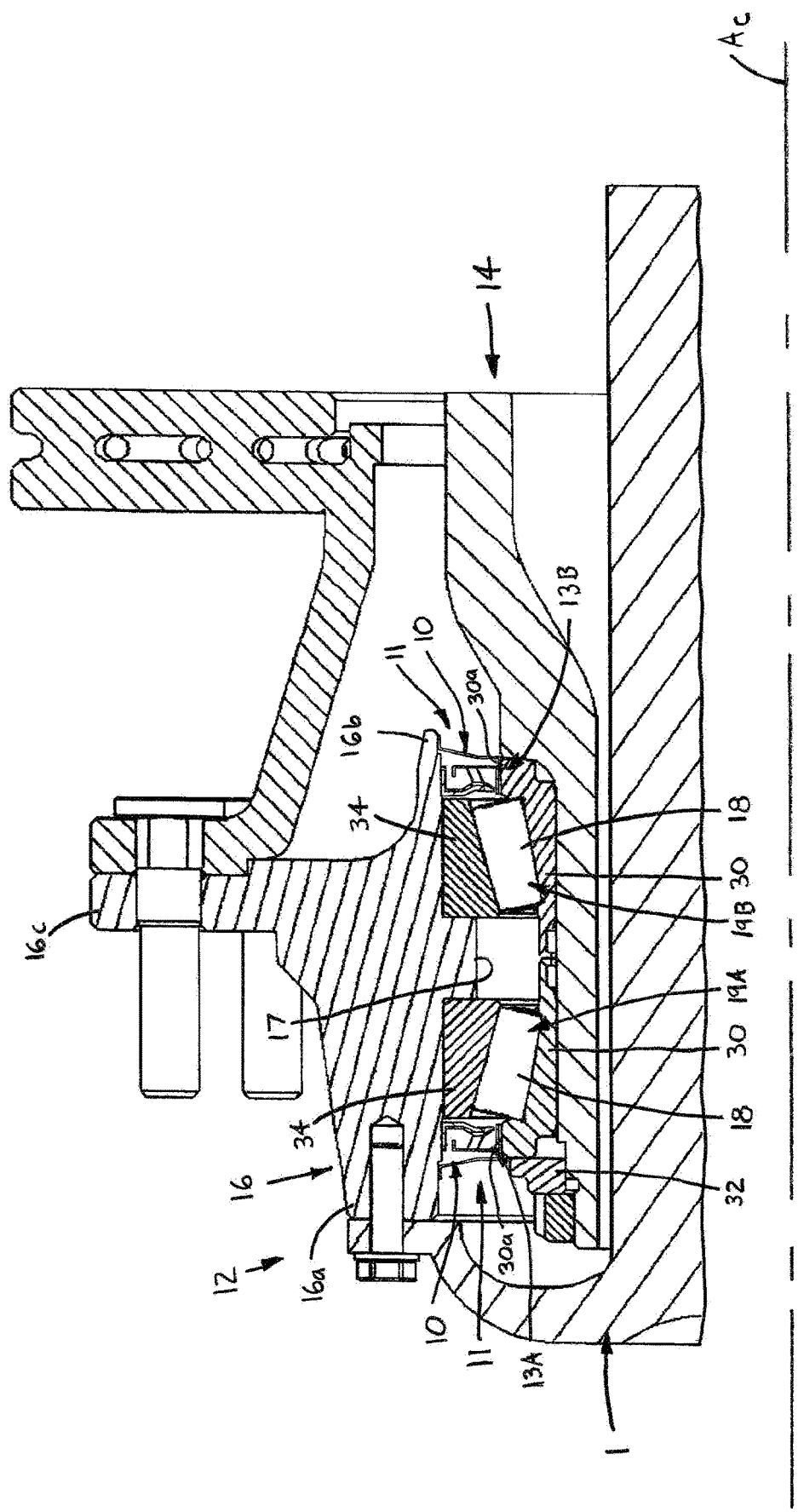
FIG. 1 is an axial cross-sectional view of a wheel bearing assembly including two seal assemblies each having a flinger in accordance with a first construction.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 an annular flinger 10 for a seal assembly 11 of a wheel bearing assembly 12, preferably for an electrically powered or "electric" truck. The wheel bearing assembly 12 includes an inner axle 14 with a central axis $A_C$, an outer hub 16 having an inner circumferential surface 17 defining a bore 21, the axle 14 extending through the bore 21, and a plurality of rolling elements 18 disposed between and rotatably coupling the hub 16 with the axle 14 such that the hub 16 rotates about the central axis $A_C$. The seal assembly 11 basically comprises an annular inner case 20 disposed about the axle 14, a seal 22 coupled with the hub 16 and having at least one sealing lip 24 sealing engaged with the inner case 20, and the annular flinger 10. The flinger 10 has an inner radial end 10a coupled with or integrally formed with the inner case 20 and an outer radial end 10b spaced radially inwardly from the hub 16 so as to define an outer annular labyrinth gap $LG_{AO}$.

As best shown in FIG. 1, the axle 14 is fixedly connected with a vehicle frame (not shown) and has an outer circumferential surface 14a, at least one and preferably two inner bearing rings 30 disposed about the outer surface 14a, and at least one nut 32 securing the ring(s) 30 onto the axle 14. Alternatively, the axle 14 may have one or more inner raceway grooves (none shown) formed directly on the hub outer surface 14a. The hub 16 further has two opposing axial ends 16a, 16b, a flange portion 16c and at least one and preferably two outer bearing rings 34 disposed within the bore 21, but may alternatively have one or more outer raceway grooves formed in the inner surface 17. The hub 16 is connected with a wheel (not shown), with a drive shaft 1 and with a steering mechanism and/or a suspension assembly (neither shown). Preferably, the wheel bearing assembly 12 includes two sets or "rows" 19A, 19B of the rolling elements 18 each disposed between a separate pair of aligned inner and outer rings 30, 34, such that the wheel bearing assembly 12 is a "double row" bearing, as depicted in FIG. 1. However, the wheel bearing assembly 12 may alternatively be a single row bearing or have three or more rows of rolling elements 18 or/and disposed within grooves in the axle 14 or hub 16 (no alternatives shown). Further, the rolling elements 18 are preferably tapered rollers as shown in FIG. 1, but may alternatively be any other known type of rolling element, such as balls, cylindrical rollers, spherical rollers, needles, etc.

Furthermore, the seal assembly 11 is preferably configured to retain lubricant, such as oil, grease, etc., about the rolling elements 18 and to prevent contaminants or "substances" (e.g., water, brake dust, mud, etc.) from entering the space about the rolling elements 18. Preferably, the wheel bearing assembly 12 includes a pair of the seal assemblies 11, specifically a first seal assembly 13A and a second seal assembly 13B, each seal assembly 13A, 13B being disposed on a separate axial side of the one or more rows 19A, 19B of rolling elements 18, as shown in FIG. 1. However, the wheel bearing assembly 12 may include only a single seal assembly 11, for example if one axial end 16a or 16b of the hub 16 is enclosed by other structure or components.

Figure 4:
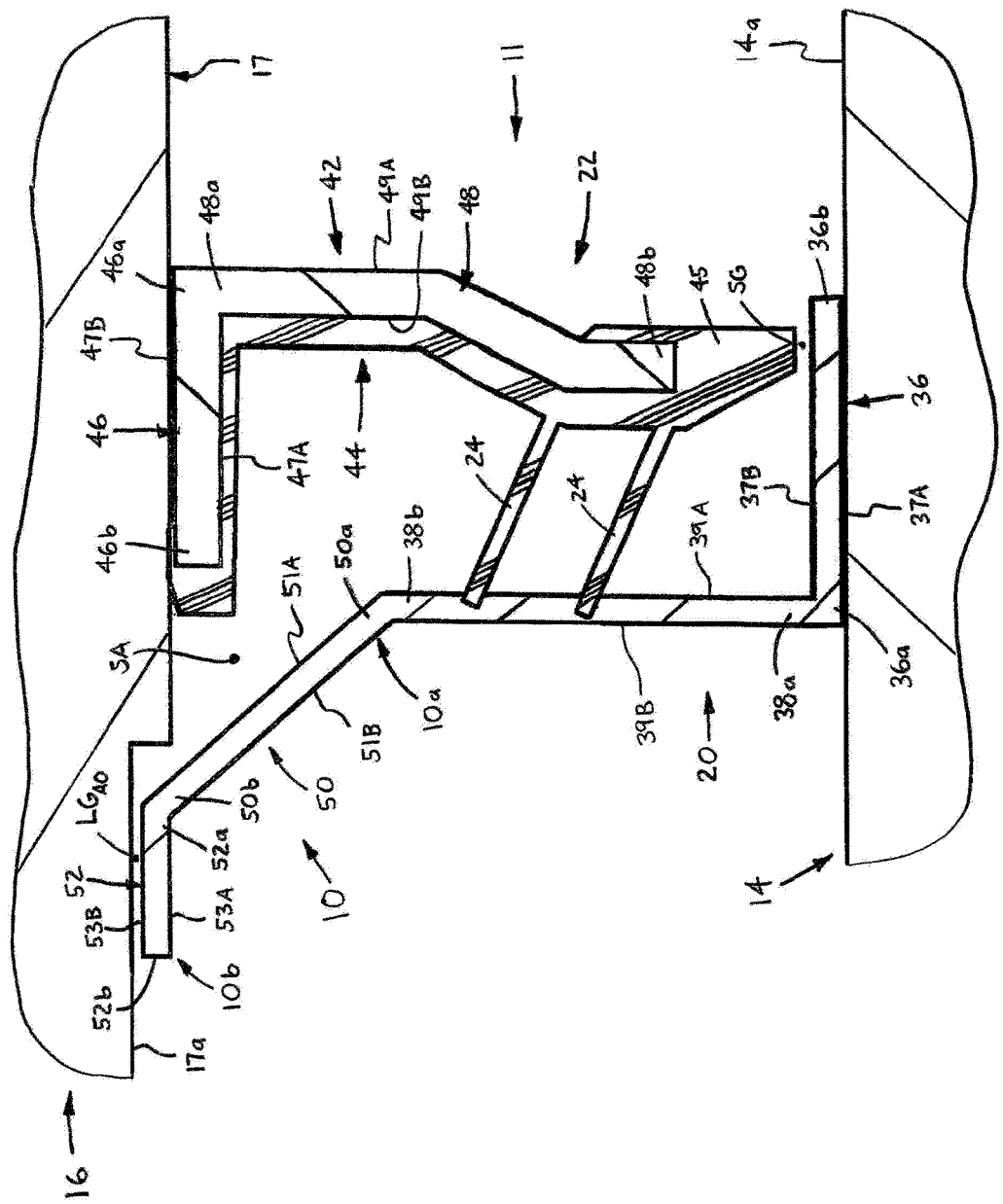
FIG. 4 is a broken-away, enlarged axial cross-sectional view of an upper portion of the wheel bearing assembly, showing one seal assembly with a second construction flinger.
Figure 5:
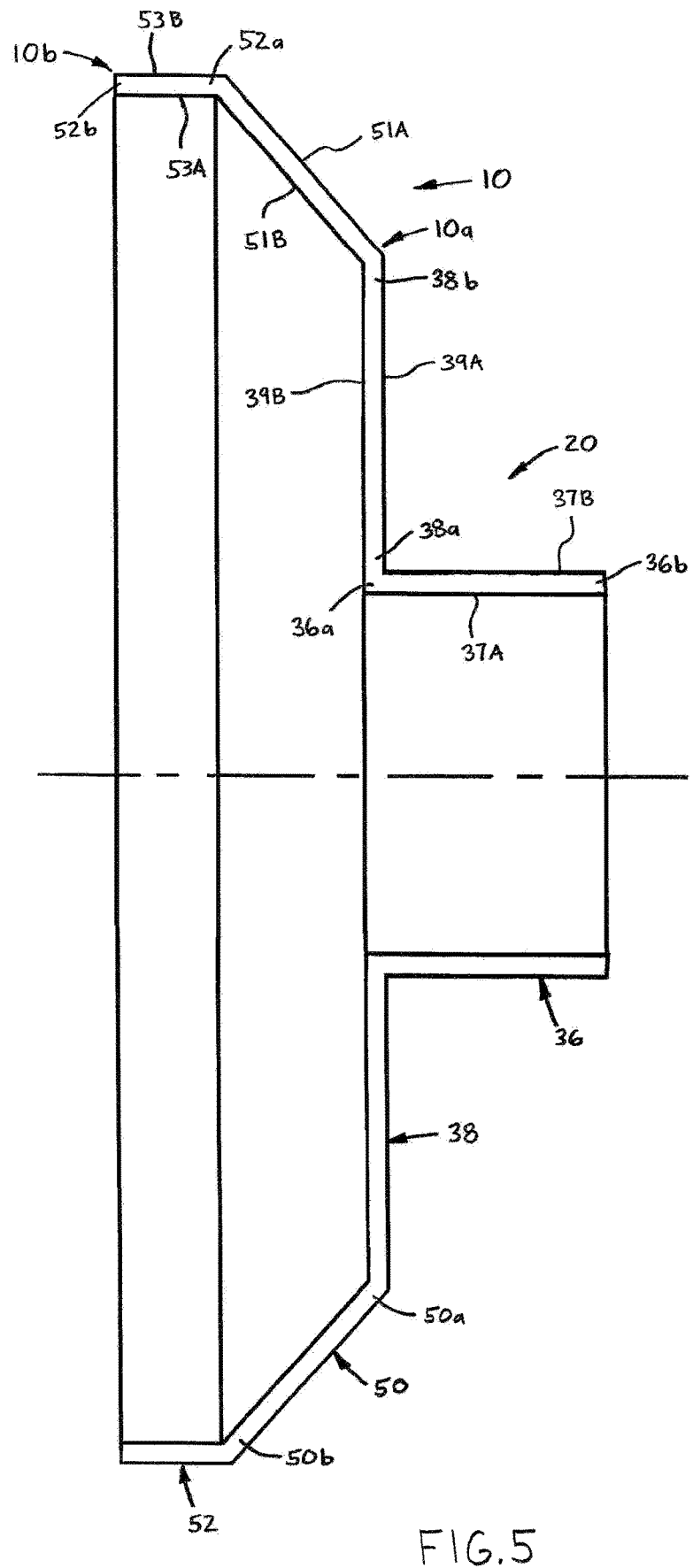
FIG. 5 is an axial cross-sectional view of the second construction flinger, shown separate from the seal assembly.

Referring to FIGS. 2-15, with each seal assembly 11, the annular inner case 20 includes an inner axial portion 36 disposable about the axle 14 and a radial portion 38 extending radially outwardly from the axial portion 36. More specifically, the case axial portion 36 has opposing first and second axial ends 36a, 36b, respectively, and inner and outer circumferential surfaces 37A, 37B, respectively, and is preferably disposed about one of the bearing inner rings 30. However, the case axial portion 36 may alternatively be disposed directly about the outer circumferential surface 14a of the axle 14 or about the nut 32 or another component disposed about the axle 14. Further, the radial portion 38 has an inner radial end 38a integrally formed with the first axial end 36a of the case axial portion 36, an opposing outer radial end 38b and opposing radial surfaces 39A, 39B. Preferably, the inner case 20 also includes an outer axial portion 40 extending axially from the outer radial end 38b of the case radial portion 38 and generally toward the seal 22, and having first and second axial ends 40a, 40b and inner and outer circumferential surfaces 41A, 41B. However, the inner case 20 may be formed without an outer axial portion as depicted in FIGS. 4 and 5.

Furthermore, the seal 22 preferably includes an annular outer case 42 coupled with the hub 16 and an elastomeric sealing member 44 attached to, preferably bonded to, the outer case 42 and providing the sealing lip(s) 24. Specifically, the outer case 42 includes an axial portion 46 with opposing first and second axial ends 46a, 46b and inner and outer circumferential surfaces 47A, 47B, respectively, the outer circumferential surface 47B preferably being frictionally engaged with a section of the hub inner circumferential surface 17. The seal outer case 42 also includes a radial portion 48 extending radially inwardly from the axial portion 46 and having an outer radial end 48a integrally formed with first axial end 48a of the case axial portion 46, an inner radial end 48b, and opposing axial surfaces 49A, 49B. In the exemplary embodiment, the sealing member 44 includes at least one and preferably two axial annular sealing lips 24 engageable with the radial surface 39A of the inner case radial portion 38 and a radial shoulder 45 spaced outwardly from the outer circumferential surface 37B of the inner case axial portion 36 so as to define an annular labyrinth gap SG. However, the sealing member 44 may include any number of axial sealing lips, one or more radial sealing lips (none shown) engageable with the outer circumferential surface 37B of the inner case axial portion 36 or/and other radial or axial lips or shoulders (none shown) defining labyrinth gaps.

Still referring to FIGS. 2-15, the annular flinger 10 includes a central portion 50 extending radially between the inner radial end 10a and the outer radial end 10b and having inner and outer radial ends 50a, 50b and opposing first and second radial surfaces 51A, 51B, the first surface 51A facing generally toward the seal 22. The flinger central portion 50 is configured to obstruct an annular space SA defined between the hub 16 and the outer radial end 38b of the case radial portion 38. In most constructions of the flinger 10 as described below, at least a section of the flinger central portion 50 is frustoconical and extends radially outwardly from the inner radial end 10a of the flinger 10 in a direction axially away from the seal 22. With this structure, any substances contacting the first surface 51A of the flinger central portion 50 will be directed axially away from the seal 22 by the frustoconical section, particularly when such substances are disposed on lower portions of the flinger 10 due to the effect of gravity.

Also, the flinger 10 includes an outer axial portion 52 at the outer radial end 10b, which extends from the outer radial end 50b of the central portion 50 in a direction generally away from the seal 22. The outer axial portion 52 has first and second axial ends 52a, 52b, respectively, and opposing inner and outer circumferential surfaces 53A, 53B, respectively. The outer surface 53B of the outer axial portion 52 is spaced radially inwardly from the inner circumferential surface 17 of the hub 16, or a section thereof as discussed below, so as to define the outer annular labyrinth gap $LG_{AO}$, which is substantially axially elongated. Further, in most constructions, the flinger 10 includes an inner axial portion 54 having opposing first and second axial ends 54a, 54b and inner and outer circumferential surfaces 55A, 55B. The inner axial portion 54 is either coupled with the inner axial portion 36 of the inner case 20 (FIGS. 1-3) or with the outer axial portion 40 of the inner case 20 (FIGS. 6-15), as discussed in detail below. However, the flinger 10 may be formed without an inner annular portion, particularly when the flinger inner end 10a is integrally formed with the seal inner case 20, as depicted in FIGS. 4 and 5.

By providing both the central portion 50 obstructing the annular space SA and the outer axial portion 52 defining the elongated outer annular labyrinth gap $LG_{AO}$, the flinger 10 substantially reduces the amount of space through which contaminants or other substances may enter the seal assembly 11, thereby greatly increasing the sealing efficiency of the seal assembly 11 without increasing friction within the wheel bearing assembly 12. Further, the flinger 10 is preferably formed as an integral or one-piece member, but may alternatively be formed of a plurality of separately formed and connected parts, and is preferably fabricated of a molded polymer, a stamped metal, or any other appropriate material. Having described the basic structure and functioning of the flinger 10 above, the various presently preferred alternative constructions of the flinger 10 are described in detail below.

Figure 2:
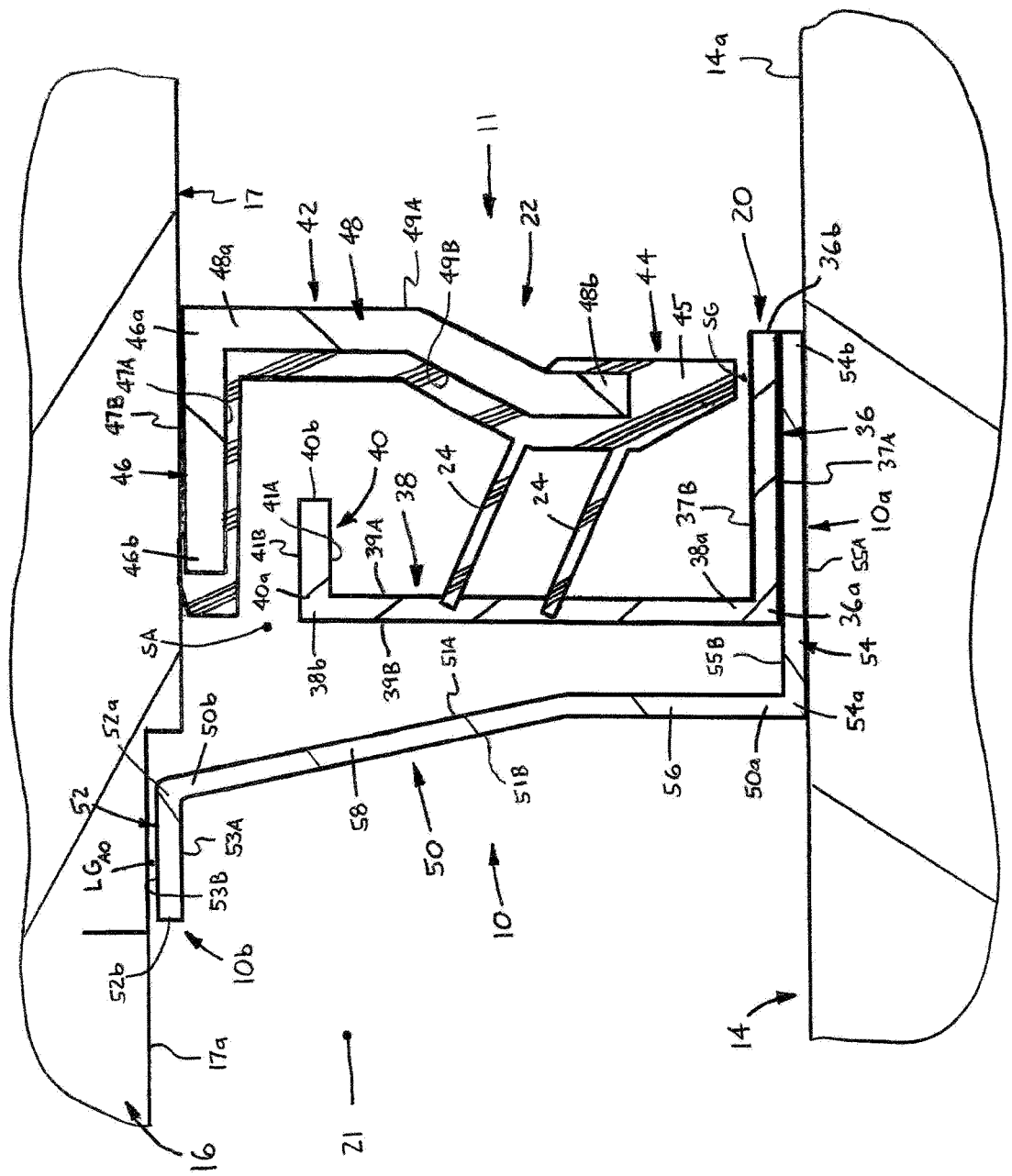
FIG. 2 is a broken-away, enlarged axial cross-sectional view of an upper portion of the wheel bearing assembly, showing one seal assembly with a first construction flinger.
Figure 3:
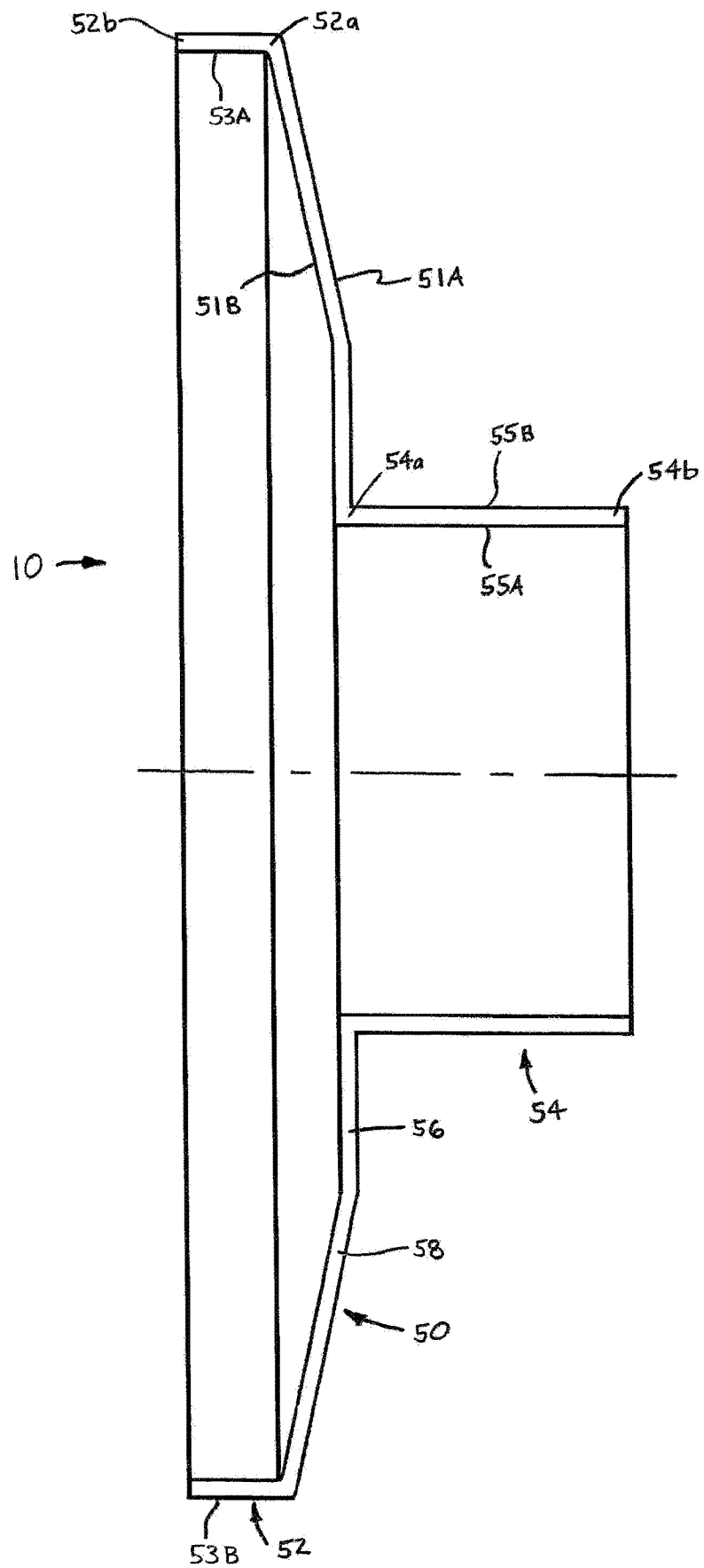
FIG. 3 is an axial cross-sectional view of the first construction flinger, shown separate from the seal assembly.

Referring to FIGS. 1-3, in a first construction, the annular flinger 10 is configured to be mounted to the axle 14, preferably to one of the bearing inner rings 30, and has a central portion 50 sized to extend radially between the axle 14, preferably from the bearing inner ring 30, and the outer hub 16. Specifically, the first construction flinger 10 has an inner axial portion 54 sized to fit about a portion of the axle 14, preferably about the outer surface 30a of the bearing inner ring 30 as shown in FIG. 1. The inner axial portion 36 of the inner case 20 is mounted about the outer surface 55B of the flinger axial portion 54, such that the flinger axial portion 54 is sandwiched radially between the case axial portion 36 and the bearing inner ring 30 and the inner and outer surfaces 53A, 53B of the axial portion 54 are each preferably frictionally engaged with the ring outer surface 30a (or axle outer surface 14a) and the case axial portion inner surface 37A, respectively.

Further, the central portion 50 of the first construction flinger 10 is spaced axially from the radial section 38 of the inner case 20 and includes an inner radial disc section 56 and an outer frustoconical section 58. The radial disc section 56 extends radially outwardly from the first axial end 54a of the inner axial portion 54 and the frustoconical section 58 extends both radially outwardly from the inner radial section 56 and generally axially away from the seal 22. Further, the outer axial portion 52 of the first construction flinger 10 is generally cylindrical and is preferably spaced radially inwardly from a cylindrical surface section 17a of the hub inner surface 17, which is spaced radially outwardly from a remainder of the inner surface 17, such that the outer annular labyrinth gap $LG_{AO}$ is generally cylindrical.

In a second construction shown in FIGS. 4 and 5, the annular flinger 10 is integrally formed with the seal inner case 20, such that that the case 20 and the flinger 10 are formed as a single annular body, preferably of one-piece construction. Specifically, the second construction flinger 10 does not include an inner axial portion and the inner radial end 10a is provided by the inner radial end 50a of the central portion 50, which is integrally formed with the outer radial end 38b of the inner case radial portion 38. The central portion 50 is entirely frustoconical and extends axially and radially to the outer axial portion 52 providing the flinger outer radial end 10b. The outer axial portion 52 is cylindrical, extends axially from the outer radial end 50b of the central portion 50, and is spaced radially inwardly from the hub outwardly-stepped surface section 17a to define a generally cylindrical outer annular labyrinth gap $LG_{AO}$.

Figure 6:
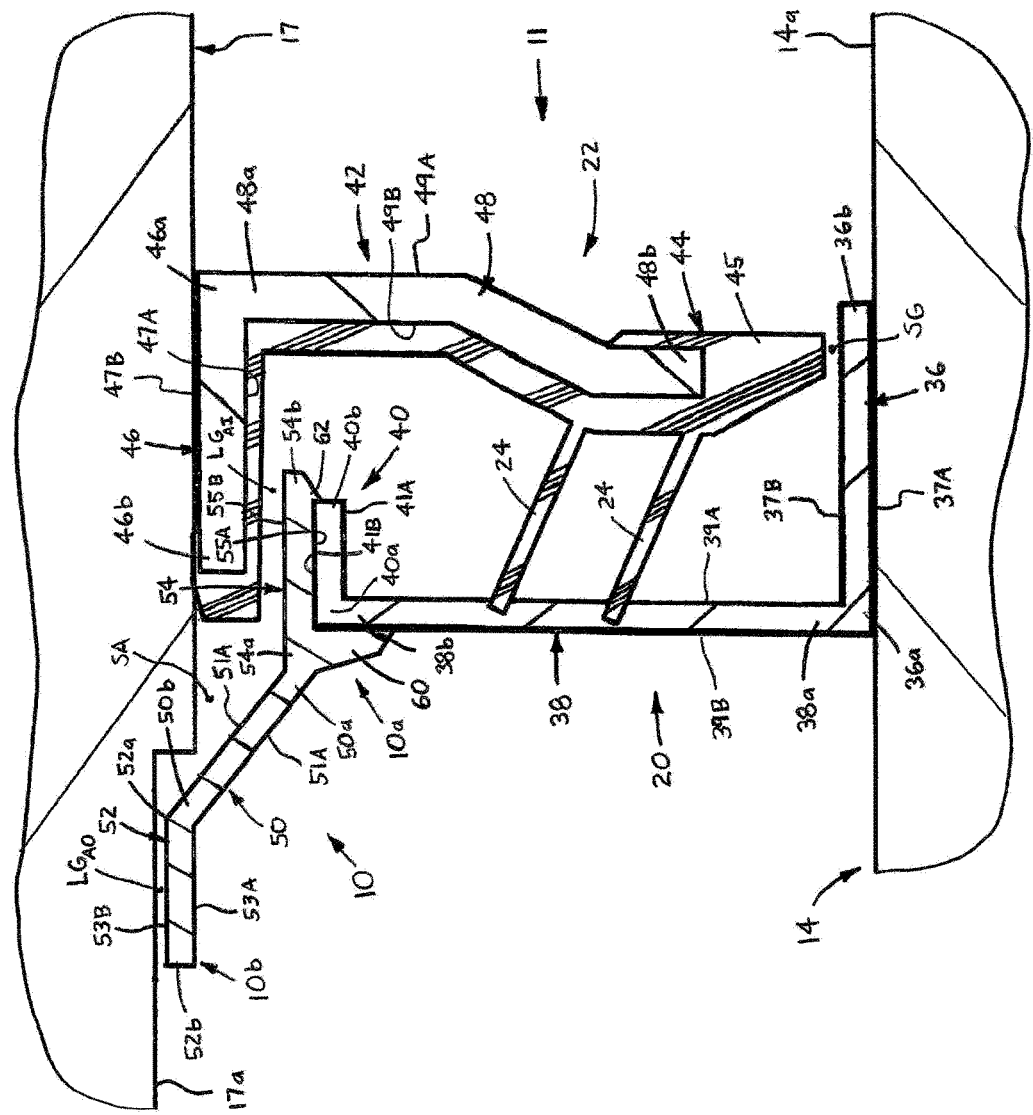
FIG. 6 is a broken-away, enlarged axial cross-sectional view of an upper portion of the wheel bearing assembly, showing one seal assembly with a third construction flinger.
Figure 7:
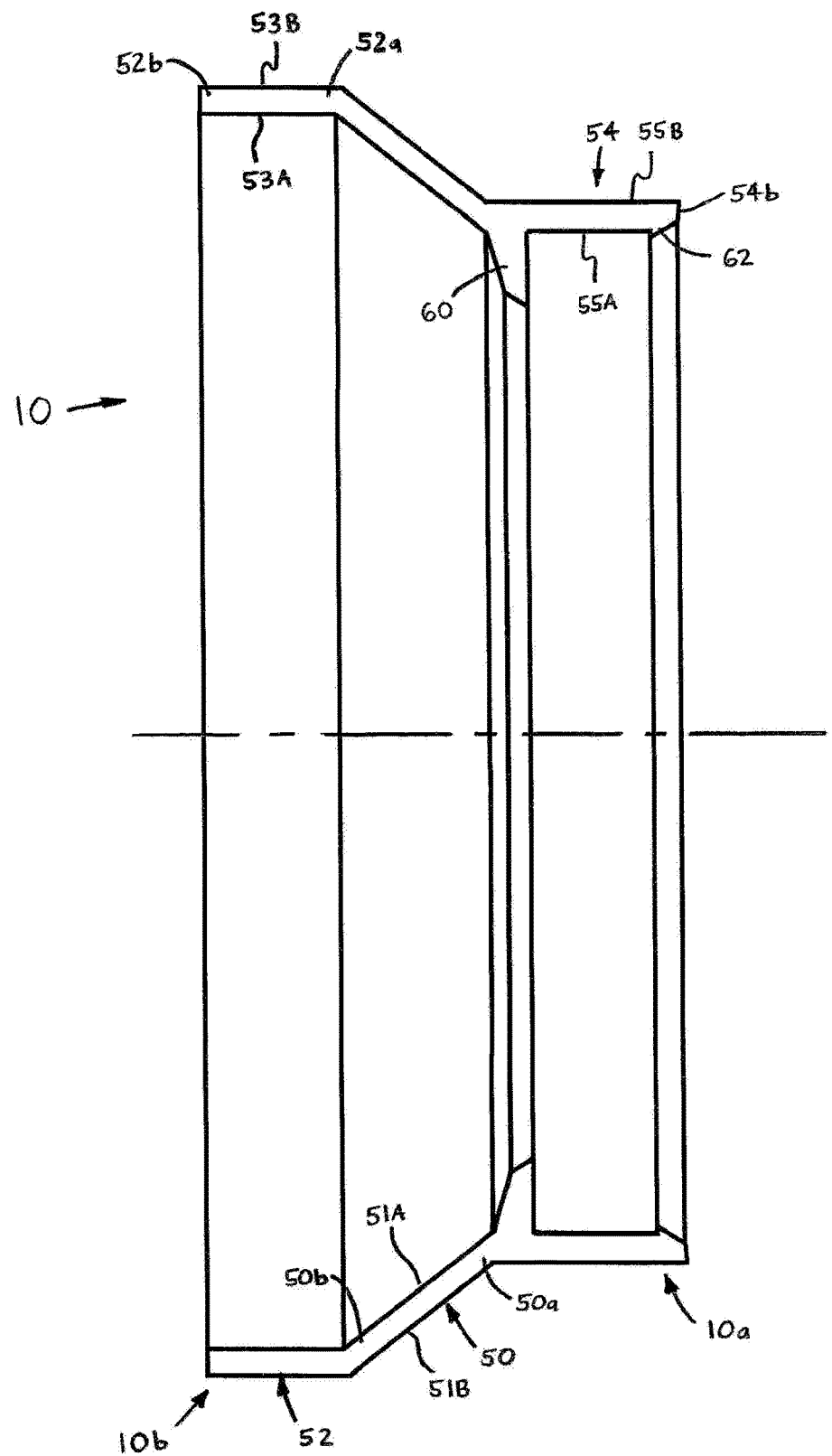
FIG. 7 is an axial cross-sectional view of the third construction flinger, shown separate from the seal assembly.

Referring now to FIGS. 6 and 7, a third construction of the flinger 10 is formed to connect with the seal inner case 20, preferably with the case outer axial portion 40, such that a second, inner annular labyrinth gap $LG_{AI}$ is defined between the flinger inner axial portion 54 and the outer case axial portion 46. Specifically, the third construction flinger 10 includes an inner axial portion 54 with an inner circumferential surface 55A sized to fit about the outer circumferential surface 41B of the case axial portion 40 and two annular shoulders 60, 62 extending radially inwardly from the inner circumferential surface 55A. When the flinger axial portion 54 is disposed about the case axial portion 40, each shoulder 60, 62 is disposed against a separate axial end 40a, 40b, respectively, of the case outer axial portion 54, such that the shoulders 60, 62 frictionally engage the axial portion ends 40a, 40b to releasably couple the flinger 10 with the inner case 20.

Alternatively, the flinger inner axial portion 54 may be attached to the case axial portion 40 by adhesive bonding, by one or more fasteners, etc. In any case, the inner annular labyrinth gap $LG_{AI}$ is defined between the outer circumferential surface of the flinger inner axial portion 54 and the inner circumferential surface 47A of the outer case axial portion 46, or more preferably a portion of the elastomeric sealing member 44 attached thereto. Further, the third construction flinger 10 includes an entirely frustoconical central portion 54 and a cylindrical outer axial portion 52 spaced radially inwardly from the radially-outwardly stepped hub surface section 17a.

Figure 10:
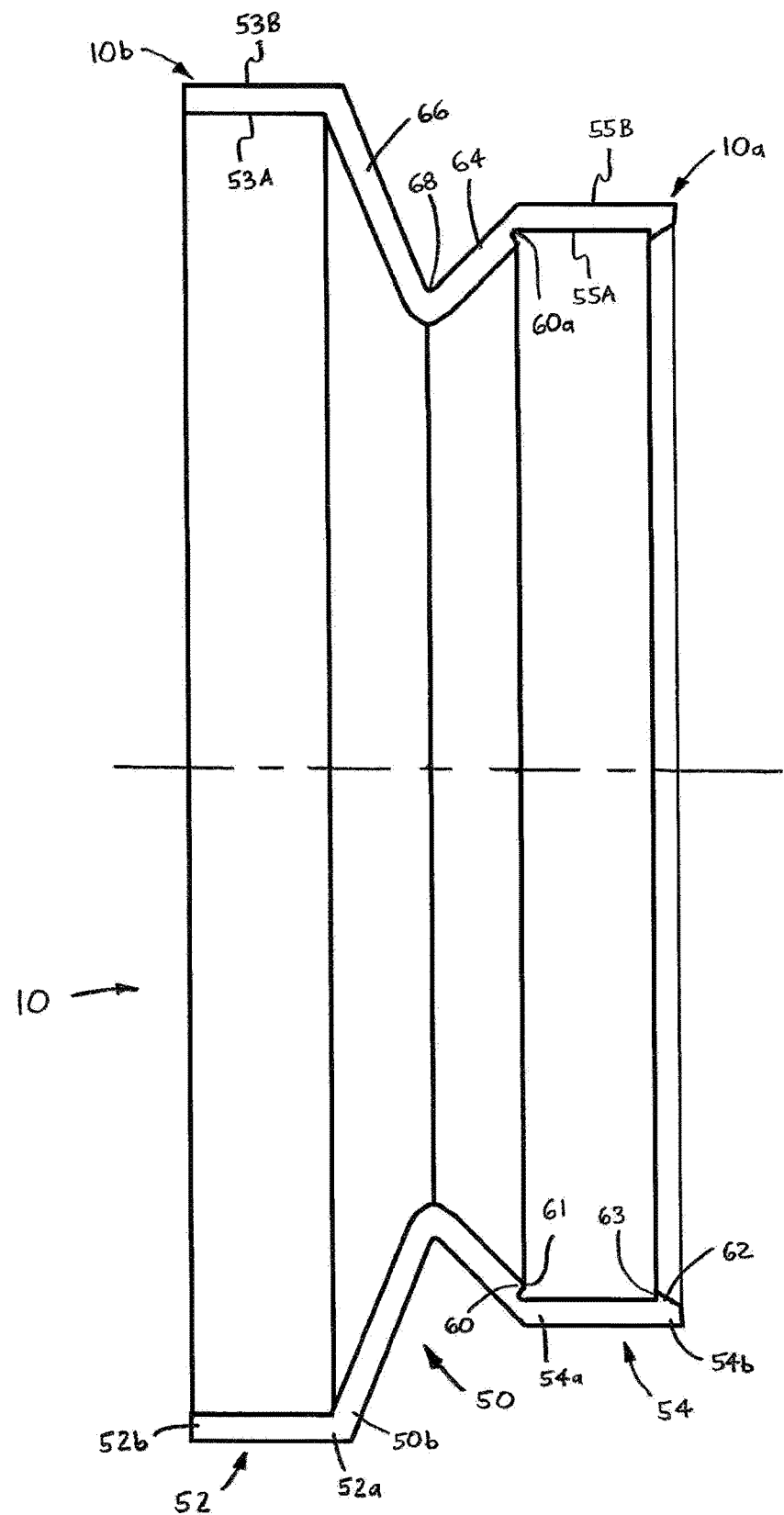
FIG. 10 is an axial cross-sectional view of the fourth construction flinger, shown separate from the seal assembly.

As shown in FIGS. 8-10, a fourth construction of the flinger 10 has an inner axial portion 54 formed generally similarly to the axial portion 54 of the third flinger construction and defining the inner annular labyrinth gap $LG_{AI}$, except that the shoulders 60, 62 of the fourth construction are configured to "snap-fit" about the outer axial ends 40a, 40b of case outer axial portion 40. Specifically, an outer shoulder 60 includes an annular undercut groove 60a such that the shoulder 60 is deflectable axially to enable the two shoulders 60, 62 to fit over the ends 40a, 40b of the axial portion 40. Thereafter, the outer shoulder 60 snaps back so that radial surfaces 61, 63 (FIG. 10) of the two shoulders 60, 62, respectively, frictionally engage the first and second axial ends 40a, 40b to frictionally couple the flinger 10 with the inner case 20.

Further, the central portion 50 of the fourth construction flinger 10 has generally V-shaped axial cross-sections and includes a first frustoconical section 64 and a second frustoconical section 66. Specifically, the first frustoconical section 64 extends radially inwardly from the inner radial end 10a of the flinger 10, specifically the first axial end 54a of the inner axial portion 54, and the second frustoconical section 66 extends radially outwardly from the first frustoconical section 64 to the outer axial portion 52 of the flinger 10. With this structure, an annular channel 68 is defined between the first frustoconical section 64 and the second frustoconical section 66 for collecting substances passing through the outer annular labyrinth gap $LG_{AO}$. Such substances thereafter fall or flow downwardly around the channel 68 by gravity and thereafter fall outwardly from the flinger 10 on a bottom or lower end of the wheel bearing assembly 12. Further, the outer axial portion 52 of the fourth construction flinger 10 is cylindrical and spaced radially-inwardly from the outwardly stepped surface section 17a of the hub inner surface 17.

Figure 11:
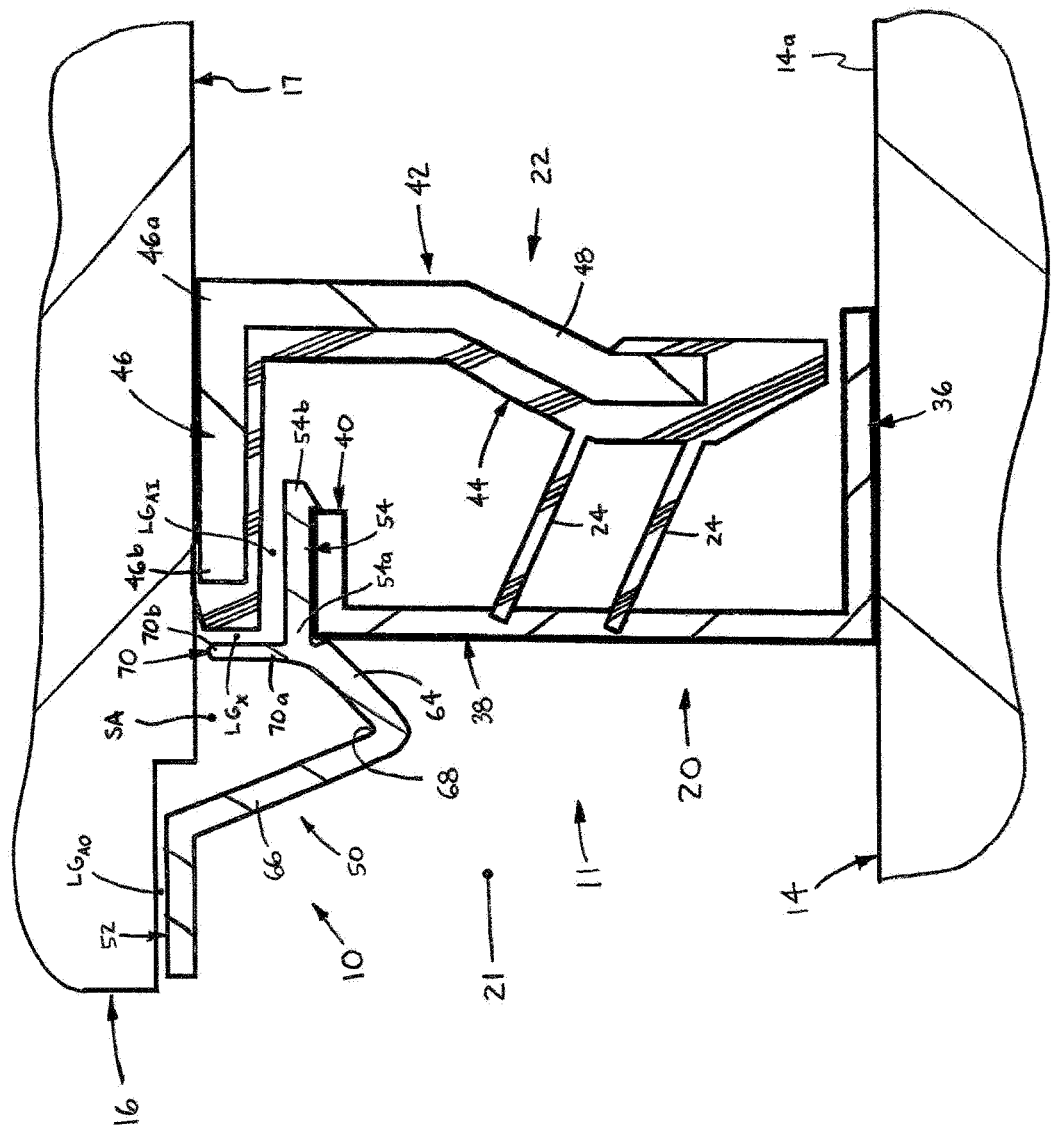
FIG. 11 is a broken-away, enlarged axial cross-sectional view of an upper portion of the wheel bearing assembly, showing one seal assembly with a fifth construction flinger.

Referring particularly to FIG. 11, a fifth construction of the flinger 10 is formed substantially identically to the fourth construction flinger 10 except that the fifth construction flinger 10 further includes an annular rib 70 extending radially outwardly from the inner axial portion 54. Specifically, the rib 70 has an inner radial end 70a integral with the first axial end 54a of the flinger inner axial portion 54 and an opposing outer radial end 70b. The rib outer radial end 70b is spaced axially from the second axial end 46b of the seal case axial portion 46 so as to define an axial labyrinth gap $LG_X$, which leads into the inner annular labyrinth gap $LG_{AI}$. Thus, the fifth construction flinger 10 provides three labyrinth gaps $LG_{AO}$, $LG_{AX}$, and $LG_{AI}$ for increased sealing capability of the flinger 10.

Figure 12:
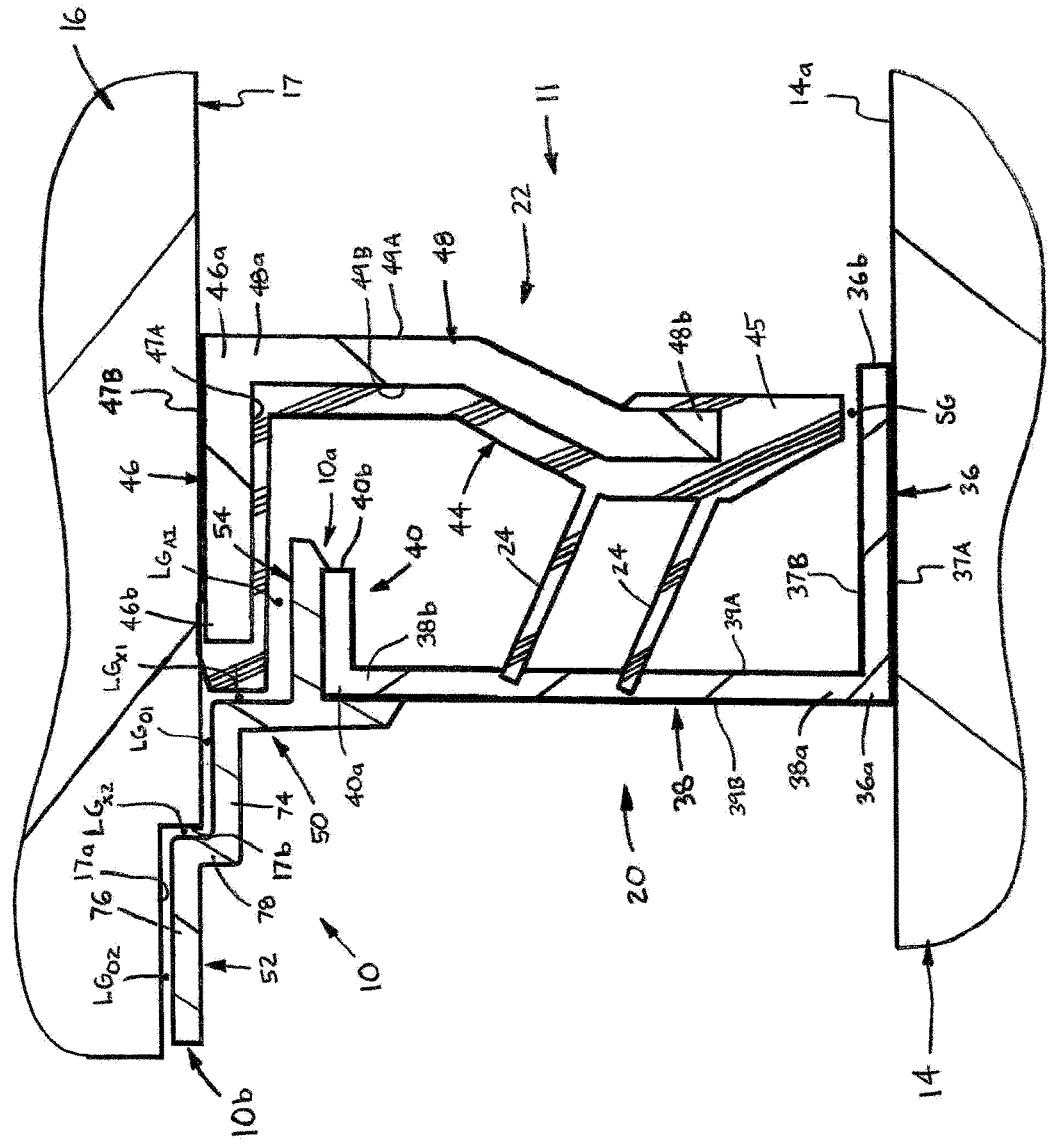
FIG. 12 is a broken-away, enlarged axial cross-sectional view of an upper portion of the wheel bearing assembly, showing one seal assembly with a sixth construction flinger.
Figure 13:
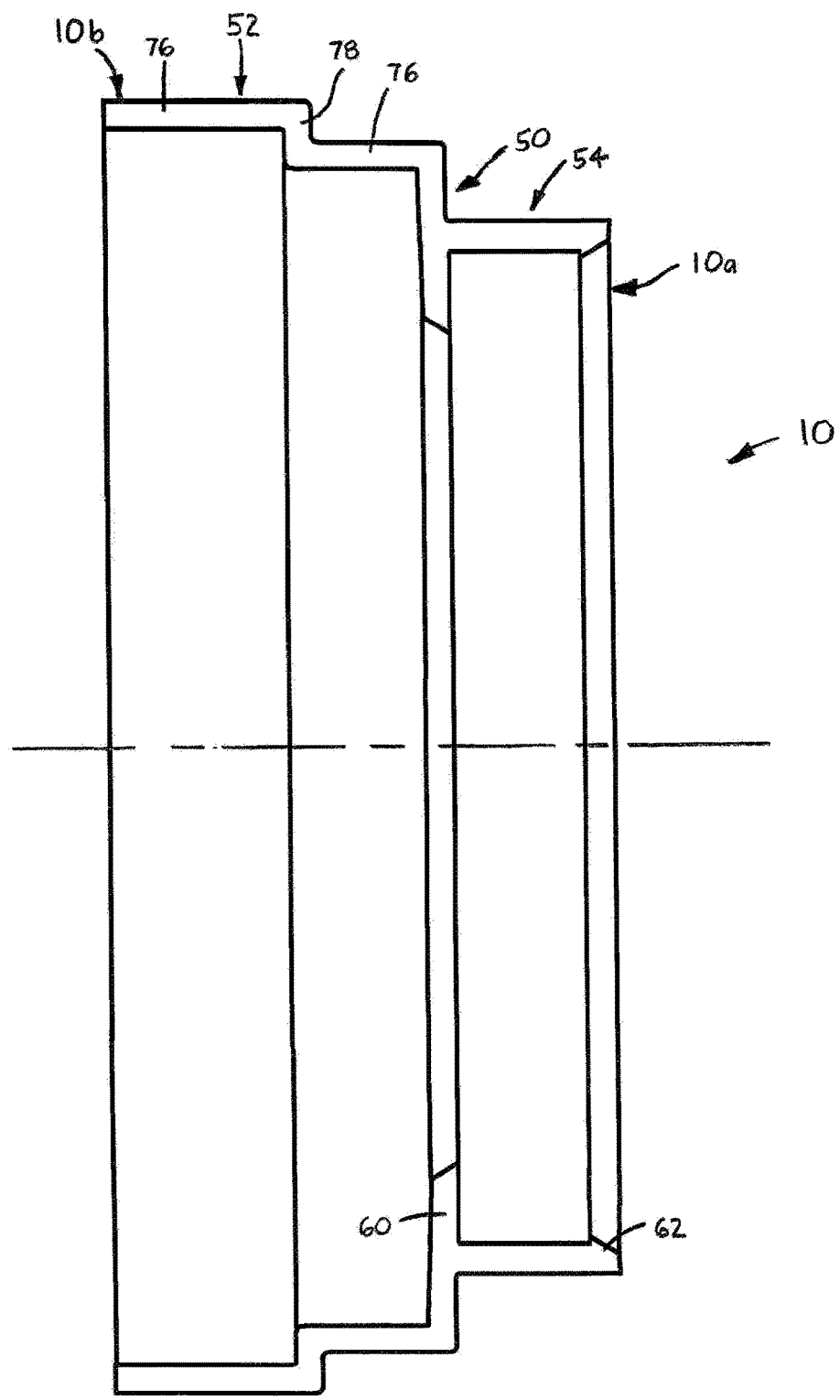
FIG. 13 is an axial cross-sectional view of the sixth construction flinger, shown separate from the seal assembly.

In a sixth construction shown in FIGS. 12 and 13, the flinger 10 includes an inner axial portion 54 preferably formed identically to the axial portion 54 of the third construction and provides the inner annular labyrinth gap $LG_{AI}$. The central portion 50 of the sixth construction flinger 10 is generally frustoconical and has a substantially lesser radial length or extent in comparison with the other flinger constructions. The central portion 50 is spaced axially from the second axial end 46b of the outer case axial portion 46, preferably from a portion of the elastomeric sealing member 44 molded thereon, so as to define a first axial labyrinth gap $LG_{X1}$.

Further, the outer axial portion 52 of the sixth construction flinger 10 includes a first, inner axial section 74 extending axially from the central portion 50, a second, outer axial section 76 spaced radially outwardly from the first axial section 74, the second outer section 76 being substantially longer than the first section 74, and a radial section 78 extending between and connecting the first and second axial sections 74, 76. The first axial section 74 is spaced radially inwardly from the hub inner surface 17 so as to define a first outer annular labyrinth gap $LG_{O1}$ and the second axial section 76 is spaced radially inwardly from the outwardly stepped cylindrical surface section 17a of the hub inner surface 17 so as to define a second, longer outer annular labyrinth gap $LG_{O2}$. Also, the radial section 78 is spaced axially from a radial surface 17b extending between the hub inner surface 17 and the outwardly stepped surface section 17a so as to define a relatively "short" second axial labyrinth gap $LG_{X2}$. With the structure of the sixth construction flinger 10, a relatively long, tortuous path is defined between the flinger 10 and the outer hub 16, which includes the second outer labyrinth gap $LG_{O2}$, the second axial labyrinth gap $LG_{X2}$, the first outer labyrinth gap $LG_{O1}$, the first axial labyrinth gap $LG_{X1}$ and the inner annular labyrinth gap $LG_{AI}$, which substantially prevents the ingress of contaminants or other substances into the seal assembly 11 without any increase of frictional loading within the bearing assembly 12.

Figure 14:
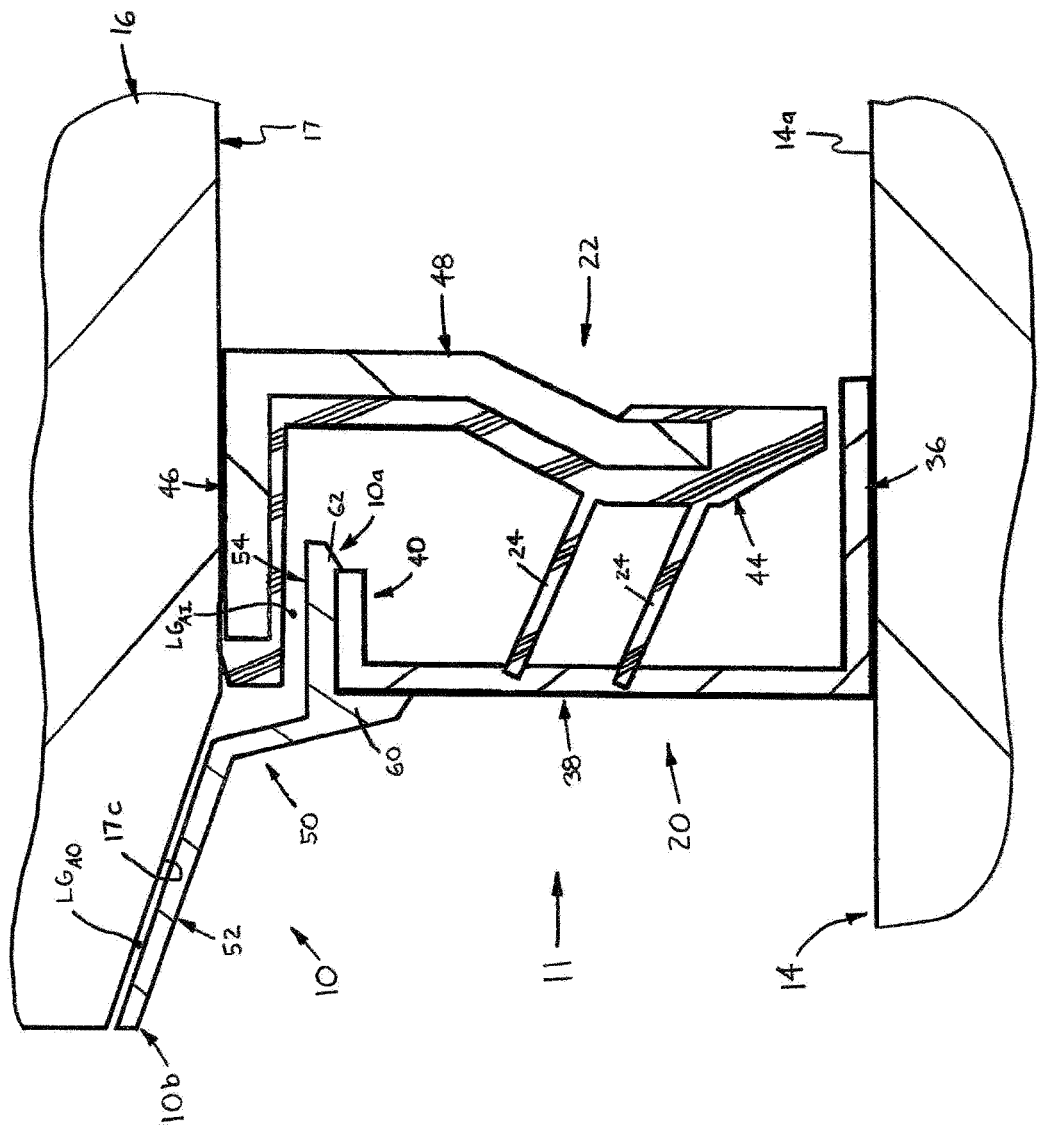
FIG. 14 is a broken-away, enlarged axial cross-sectional view of an upper portion of the wheel bearing assembly, showing one seal assembly with a seventh construction flinger.
Figure 15:
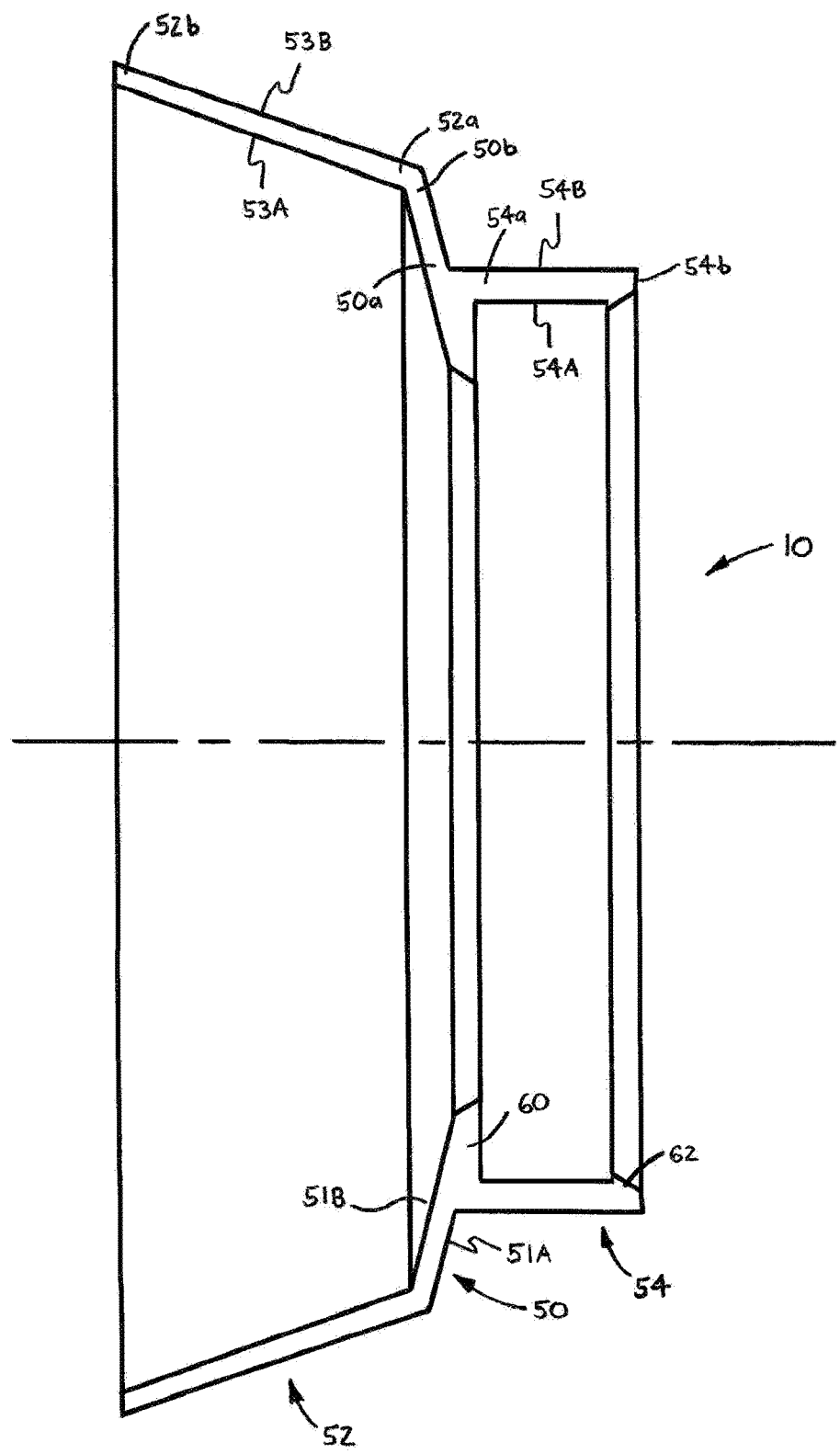
FIG. 15 is an axial cross-sectional view of the seventh construction flinger, shown separate from the seal assembly.

Referring now to FIGS. 14 and 15, a seventh construction of the flinger 10 is formed generally similarly to the third construction flinger 10 and includes a substantially identical inner axial portion 54. The inner axial portion 54 is coupled to the outer axial portion 40 of the inner case 20 in similar or identical manner so as to define the inner annular labyrinth gap $LG_{AI}$. The central portion 50 of the seventh construction flinger 10 is frustoconical as with third construction flinger 10, but has a lesser radial length/extent in comparison with the third construction. Further, the outer axial portion 52 has a substantial length, is frustoconical, and is spaced radially inwardly from an inner frustoconical surface section 17c of the outer hub inner circumferential surface 17 such that the outer annular labyrinth gap $LG_{AO}$ is also frustoconical. With the frustoconical outer axial portion 52 and the frustoconical outer annular labyrinth gap $LG_{AO}$, substances entering the gap $LG_{AO}$ are directed axially away from the seal 22 within lower portions of the flinger 10.

Although seven presently preferred constructions of the annular flinger 10 are described above and depicted in the drawing figures, the flinger 10 may be formed with any combination of the structural features of the disclosed constructions that is capable of functioning generally as described herein. That is, the scope of the present invention includes the depicted and described flinger constructions and any other flinger construction that has an inner radial end coupled with or integrally formed with the annular inner case 20 of the seal assembly 11 and an outer radial end defining a labyrinth gap with the outer hub 16.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A seal assembly for a wheel bearing assembly, the wheel bearing assembly including an inner axle with a central axis, an outer hub disposed about the inner axle and having an inner circumferential surface defining a bore, the axle extending through the bore, and a plurality of rolling elements disposed between and rotatably coupling the hub with the axle such that the hub rotates about the axis, the seal assembly comprising:

an annular inner case having an axial portion disposable about the axle and a radial portion extending radially outwardly from the axial portion;

a seal coupled with the hub and having at least one sealing lip sealingly engageable with the annular case; and an annular flinger having an inner radial end coupled with the annular inner case and an outer radial end including an outer axial portion spaced radially inwardly from the inner circumferential surface of the hub so as to define an annular labyrinth gap;

wherein the annular inner case includes an outer axial portion extending from an outer radial end of the inner case radial portion in a direction toward the seal and the flinger includes an inner axial portion distinct from and coupled with the outer axial portion of the annular inner case.

2. The seal assembly as recited in claim 1 wherein the flinger includes a central portion extending radially between the flinger inner radial end and the flinger outer radial end and configured to obstruct an annular space between the hub and an outer radial end of the inner case radial portion.

3. The seal assembly as recited in claim 2 wherein at least a section of the flinger central portion is frustoconical and extends radially outwardly from the inner radial end of the flinger in a direction axially away from the seal.

4. The seal assembly as recited in claim 2 wherein the central portion of the flinger includes a first frustoconical section extending radially inwardly from the inner radial end of the flinger and a second frustoconical section extending radially outwardly from the first frustoconical section to the outer radial end of the flinger, an annular channel being defined between the first frustoconical section and the second frustoconical section for collecting substances passing through the annular labyrinth gap.

5. The seal assembly as recited in claim 4 wherein:
the seal includes an annular case with an axial portion coupled with the hub, the seal case axial portion having two opposing axial ends;
the annular inner case includes an outer axial portion extending from the outer end of the annular inner case axial portion; and
the flinger includes an annular rib extending radially outwardly from the inner axial portion and having an outer radial end spaced axially from the one of the axial ends of the seal case axial portion so as to define an axial labyrinth gap.

6. The seal assembly as recited in claim 1 wherein:
the seal includes an annular case with an axial portion coupled with the hub, the seal case axial portion having two opposing axial ends;
the flinger includes a central portion extending between the inner axial portion and the outer axial portion and spaced axially from one of the axial ends of the seal case axial portion so as to define an axial labyrinth gap.

7. The seal assembly as recited in claim 1 wherein:
the inner circumferential surface of the hub includes a stepped surface section spaced radially outwardly from a remainder of the inner circumferential surface; and
the outer axial portion of the flinger includes a first axial section spaced radially inwardly from the inner circumferential of the hub so as to define a first annular labyrinth gap and a second axial section spaced radially outwardly from the first axial section and radially inwardly from the stepped surface section of the hub inner surface so as to define a second annular labyrinth gap.

8. The seal assembly as recited in claim 1 wherein:
the outer axial portion of the annular inner case has an outer circumferential surface and opposing axial ends; and
the inner axial portion of the flinger has an inner circumferential surface disposed against the outer circumferential surface of the inner case outer axial portion and two annular shoulders extending radially inwardly from the inner circumferential surface, each shoulder being disposed against a separate axial end of the inner case outer axial portion.

9. The seal assembly as recited in claim 8 wherein the two shoulders of the inner axial portion of the flinger are frictionally engaged with or bonded to the axial ends of the outer axial portion of the inner case.

10. The seal assembly as recited in claim 1 wherein the outer axial portion of the flinger is frustoconical and spaced radially inwardly from a frustoconical surface section of the hub inner circumferential surface so as to define a frustoconical labyrinth gap.

11. The seal assembly as recited in claim 1 wherein the seal includes an annular case coupled with the hub and an annular elastomeric sealing member attached to the seal annular case and providing the at least one sealing lip, the sealing lip being engaged with the inner case axial portion or with the inner case radial portion.

12. A wheel bearing assembly comprising:
an inner axle with a central axis;
an outer hub disposed about the inner axle and having an inner circumferential surface defining a bore, the axle extending through the bore,
a plurality of rolling elements disposed between and rotatably coupling the hub with the axle such that the hub rotates about the central axis; and
a seal assembly comprising:
an annular inner case having an axial portion disposable about the axle and a radial portion extending radially outwardly from the axial portion;
a seal coupled with the hub and having at least one sealing lip sealingly engageable with the annular case; and
an annular flinger having an inner radial end coupled with or integrally formed with the annular inner case and an outer radial end including an outer axial portion spaced radially inwardly from the inner circumferential surface of the hub so as to define an annular labyrinth gap;
wherein the flinger includes a central portion extending radially between the flinger inner radial end and the flinger outer radial end and configured to obstruct an annular space defined between the hub and an outer radial end of the inner case radial portion, at least a section of the flinger central portion being frustoconical and extending radially outwardly from the inner radial end of the flinger in a direction axially away from the seal.

13. The wheel bearing assembly as recited in claim 12 wherein the central portion of the flinger includes a first frustoconical section extending radially inwardly from the inner radial end of the flinger and a second frustoconical section extending radially outwardly from the first frustoconical section to the outer axial portion of the flinger, an annular channel being defined between the first frustoconical section and the second frustoconical section for collecting substances passing through the annular labyrinth gap.

14. The wheel bearing assembly as recited in claim 12 wherein one of:
the inner circumferential surface of the hub includes a stepped surface section spaced radially outwardly from a remainder of the inner circumferential surface and the outer axial portion of the flinger includes a first axial section spaced radially inwardly from the inner circumferential of the hub so as to define a first annular labyrinth gap and a second axial section spaced radially outwardly from the first axial section and radially inwardly from the stepped surface section of the hub inner surface so as to define a second annular labyrinth gap; and
the inner circumferential surface of the hub includes a frustoconical surface section and the outer axial portion of the flinger is frustoconical and spaced radially inwardly from the hub frustoconical surface section so as to define a frustoconical labyrinth gap.

15. The wheel bearing assembly as recited in claim 12 wherein one of:
the annular inner case includes an outer axial portion extending from an outer radial end of the annular case radial portion in a direction toward the seal and the flinger includes an inner axial portion coupled with the outer axial portion of the annular inner case; and the flinger includes an inner axial portion disposed between the axle and the axial portion of the annular inner case and a central portion extending radially between the inner axial portion and the axial portion of the outer end and configured to obstruct an annular space between the hub and the axle.

16. A seal assembly for a wheel bearing assembly, the wheel bearing assembly including an inner axle with a central axis, an outer hub disposed about the inner axle and having an inner circumferential surface defining a bore, the axle extending through the bore, and a plurality of rolling elements disposed between and rotatably coupling the hub with the axle such that the hub rotates about the axis, the seal assembly comprising:

an annular inner case having an axial portion disposable about the axle and a radial portion extending radially outwardly from the axial portion;

a seal coupled with the hub and having at least one sealing lip sealingly engageable with the annular case; and an annular flinger having an inner radial end coupled with or integrally formed with the annular inner case and an outer radial end including an outer axial portion spaced radially inwardly from the inner circumferential surface of the hub so as to define an annular labyrinth gap, the flinger including a central portion extending radially between the flinger inner radial end and the flinger outer radial end and configured to obstruct an annular space between the hub and an outer radial end of the inner case radial portion, the central portion of the flinger including a first frustoconical section extending radially inwardly from the inner radial end of the flinger and a second frustoconical section extending radially outwardly from the first frustoconical section to the outer radial end of the flinger, an annular channel being defined between the first frustoconical section and the second frustoconical section for collecting substances passing through the annular labyrinth gap.

* * * * *